(12) United States Patent
Kappes et al.

(10) Patent No.: US 11,323,848 B2
(45) Date of Patent: May 3, 2022

(54) ASSIGNING MOBILE LOCATING UNITS OF AN INDOOR LOCATION SYSTEM TO PROCESSING PLANS

(71) Applicant: TRUMPF Werkzeugmaschinen GmbH + Co. KG, Ditzingen (DE)

(72) Inventors: Jens Kappes, Schaumburg, IL (US); Felix Weigelt, Chicago, IL (US)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 92 days.

(21) Appl. No.: 17/078,170

(22) Filed: Oct. 23, 2020

(65) Prior Publication Data
US 2021/0044934 A1 Feb. 11, 2021

Related U.S. Application Data

(63) Continuation of application No. PCT/EP2019/059871, filed on Apr. 17, 2019.

(30) Foreign Application Priority Data

Apr. 26, 2018 (DE) .......................... 102018110074.4

(51) Int. Cl.
*H04W 4/029* (2018.01)
*H04W 4/33* (2018.01)
*G05B 19/4155* (2006.01)

(52) U.S. Cl.
CPC ........ *H04W 4/029* (2018.02); *G05B 19/4155* (2013.01); *H04W 4/33* (2018.02); *G05B 2219/35005* (2013.01)

(58) Field of Classification Search
CPC .... H04W 4/029; H04W 4/33; G05B 19/4155; G05B 2219/35005; Y02P 90/30; G06Q 50/04; G06Q 10/087

(Continued)

(56) References Cited

U.S. PATENT DOCUMENTS

2003/0150908 A1\* 8/2003 Pokorny ............ G05B 13/0285
235/375
2014/0274135 A1 9/2014 Edge et al.
(Continued)

FOREIGN PATENT DOCUMENTS

CN 110238066 A \* 9/2019
DE 102016120131 4/2018
(Continued)

OTHER PUBLICATIONS

DE Office Action in German Appln. No. 102018110074, dated Feb. 28, 2019, 6 pages (English translation).
(Continued)

*Primary Examiner* — Hirdepal Singh
(74) *Attorney, Agent, or Firm* — Fish & Richardson P.C.

(57) ABSTRACT

Methods, devices, and systems for assigning mobile locating units to digital processing plans for industrial processing of workpiece groups each including at least one workpiece are provided. In one aspect, a method includes: maintaining one or more processing plans including order information for industrial processing of one or more workpiece groups each associated with a corresponding processing plan, the one or more workpiece groups being separated according to a separation plan with a machine tool, matching position data of a mobile locating unit acquired with an indoor location system with position data of the one or more workpiece groups or workpieces derived from the separation plan, assigning the mobile locating unit to a workpiece group or a workpiece based on a result of the matching, and assigning the mobile locating unit to a processing plan associated with the workpiece group or the workpiece assigned to the mobile locating unit.

20 Claims, 5 Drawing Sheets

(58) Field of Classification Search
USPC .................................................. 455/456.1
See application file for complete search history.

(56) References Cited

U.S. PATENT DOCUMENTS

| | | |
|---|---|---|
| 2015/0356332 A1 | 12/2015 | Turner et al. |
| 2016/0100289 A1 | 4/2016 | Mavorchik et al. |
| 2017/0039516 A1* | 2/2017 | Amann ................... H04W 4/33 |
| 2017/0153616 A1* | 6/2017 | Sakakibara .......... G05B 19/048 |

FOREIGN PATENT DOCUMENTS

| | | |
|---|---|---|
| DE | 102016120132 | 4/2018 |
| DE | 102017107357 | 4/2018 |
| DE | 102017120381 | 3/2019 |
| WO | WO 1996/29669 | 9/1996 |

OTHER PUBLICATIONS

PCT International Search Report and Written Opinion in International Appln. No. PCT/EP2019/059871, dated Jun. 25, 2019, 8 pages.
wikipedia.org, "Indoor positioning system," Apr. 25, 2018, retrieved May 31, 2019 from URL <https://en.wikipedia.org/w/index.php?title=Indoor_positioning system&oldid=899550658>, 13 pages.
PCT International Preliminary Report on Patentability in International Appln. No. PCT/EP2019/059871, dated Oct. 27, 2020, 7 pages.

* cited by examiner

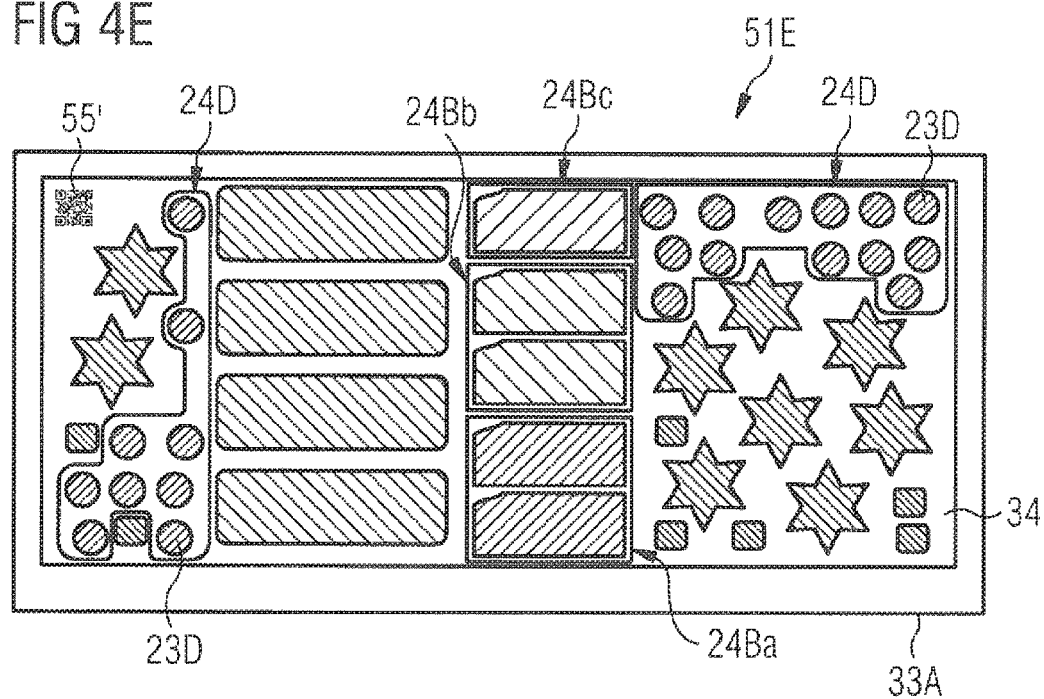

ASSIGNING MOBILE LOCATING UNITS OF AN INDOOR LOCATION SYSTEM TO PROCESSING PLANS

CROSS REFERENCE TO RELATED APPLICATIONS

This application is a continuation of and claims priority under 35 U.S.C. § 120 from PCT Application No. PCT/EP2019/059871, filed on Apr. 17, 2019, which claims priority from German Application No. 10 2018 110 074.4, filed on Apr. 26, 2018. The entire contents of each of these priority applications are incorporated herein by reference.

TECHNICAL FIELD

The present disclosure relates to methods, devices, and systems for assigning mobile locating units to processing plans for industrial processing of workpieces, for example, in metal and/or sheet metal processing.

BACKGROUND

As an example for the metal processing industry, in industrial metal and/or sheet metal processing many parts of different sizes and quantities are often fed to different processing steps. For example, workpieces are cut with a machine tool according to a cutting plan in different shapes and quantities from a preformed base material, for example, a flat material given in a sheet form. For example, the workpieces are punched out of the base or flat material or cut out with a laser. The machine tools output the processed workpieces, e.g., the laser cut material or punched sheet metal parts, lying next to each other on a sorting station, often maintaining the sheet shape. From the sorting station, they are sorted and fed to further processing steps of a production order.

The individual workpieces are made available to the respective downstream processing step in a group. Each group includes a subgroup of the several, especially different, workpieces arranged on the sorting station.

If many different shapes are cut, different processing steps are performed, and different areas in a production hall for metal and/or sheet metal processing are approached, and paper-based monitoring and control processes become complex and error-prone. In particular, replanning is very time-consuming and labor-intensive, e.g., in the event of difficult-to-predict events such as machine failure or faulty production, because the status and location of the processing of the workpieces or groups must often be determined.

The integration of an indoor location system, which can be used within a production hall, can facilitate the monitoring and control of processing steps. For example, methods to support the sorting process of workpieces produced with a flatbed machine tool, in general methods to support the processing of workpieces, are known from the (as yet unpublished) German patent applications DE 10 2016 120 132.4 ("Werkstücksammelstelleneinheit und Verfahren zur Unterstützung der Bearbeitung von Werkstücken") and DE 10 2016 120 131.6 ("Absortierunterstützungsverfahren und Flachbettwerkzeugmaschine") with filing date Oct. 21, 2016. Furthermore, a support method for sorting, e.g., cut material of a flatbed machine tool is known from the German patent application DE 10 2017 107 357.4 ("Absortierunterstützungsverfahren und Flachbettwerkzeugmaschine") with filing date Apr. 5, 2017. From the German patent application DE 10 2017 120 381.8 ("Assistiertes Zuordnen eines Werkstücks zu einer Mobileinheit eines Innenraum-Ortungssystems") with filing date Sep. 5, 2017, a digital and physical assignment of mobile units, orders and workpieces is also known. The German patent applications mentioned above are incorporated herein in their entirety.

An example of indoor localization is known from US 2016/0100289 A1, which describes a localization and tracking system for determining the positions of mobile wireless devices using, for example, "Ultra Wide Band" (UWB) technology. The positions of the mobile devices are obtained by calculating arrival time differences, for example. Motion sensors based on UWB technology, which can inter alia be extended with acceleration sensors, are disclosed according to US 2015/0356332 A1, for example, for performance analysis in sports.

SUMMARY

Implementations of the present disclosure provide methods, devices, and systems that can intelligently support manufacturing processes, e.g., in the field of metal and/or sheet metal processing, which can simplify the assignment of a mobile locating unit to a processing plan of an order stored in a production control system.

One aspect of the present disclosure features methods for assigning a mobile locating unit (or a plurality of mobile locating units) to a digital processing plan for industrial processing of a workpiece group including at least one workpiece. Several workpiece groups are separated according to a separation plan with a machine tool and are arranged on a sorting station. Furthermore, several processing plans are stored in a production control system. In each of the processing plans, order information for the industrial processing of workpiece groups is stored, where a workpiece group of a processing plan includes a subgroup of the workpieces arranged on the sorting station. The methods include the following steps: matching position data of the mobile locating unit, which were acquired with an indoor location system for a position of the mobile locating unit, with the position data of the workpieces and/or the workpiece groups derived from a separation plan; assigning the mobile locating unit to a workpiece and/or a workpiece group based on the matching; and assigning the mobile locating unit to the processing plan that includes the workpiece and/or the workpiece group to which the mobile locating unit was assigned.

In some embodiments, the methods relate to industrial processing in metal and/or sheet metal processing, in which workpieces or workpiece groups are separated from a flat material, e.g., in sheet form, according to a separation plan. In some embodiments, the workpieces are available in various shapes and quantities and have been punched or laser cut, for example. At the sorting station, the workpieces are arranged next to each other, e.g., while maintaining the sheet form.

In some embodiments, a sorting data set is stored in the production control system, which includes position data derived from the separation plan of the workpieces, which are arranged on the sorting station, in relation to the sorting station.

The position data of the mobile locating unit are acquired with the indoor location system for a position of the mobile locating unit, e.g., on top of the sorting station, such as a sorting table. The position data is provided to the production control system as a basis for the assigning procedure and is matched with the position data of the workpieces and/or workpiece groups derived from the separation plan. The mobile locating unit receives electromagnetic signals to determine the position, processes them, and generates and transmits electromagnetic signals.

In some embodiments, the assigning of the mobile locating unit to the processing plan and the assigning of the mobile locating unit to the workpiece and/or the workpiece group can be displayed immediately after the assigning. This can be done by displaying workpiece data and/or workpiece group data, for example.

For example, the displaying, which occurs immediately after the assigning, can take place within not more than 5 seconds, e.g., within not more than 2 seconds, or within not more than 1 second. In this way, an operator receives quick assistance. If he or she experiences the assignment as successful, it encourages him or her to trust this type of assigning procedure and to continue using it. The displaying can be done on a display device, e.g., a screen, on which the assigned workpieces and the assigned workpiece group are displayed together in a highlighted manner.

For this, the production control system can show a successful assignment of the mobile locating unit to a processing plan on the display of the mobile locating unit. For example, the production control system can output the successful assignment by controlling the mobile locating unit to display a workpiece parameter on a display unit to support a manual performing of the sorting of the workpieces of the processing plan assigned to the mobile locating unit.

The performed assigning can alternatively or additionally be displayed on or at the mobile tracking unit, e.g., using an LED (light emitting diode), a small display, e.g., a screen or an e-ink display, of the mobile tracking unit. A correlation between a display on a screen and a display on the mobile locating unit can also be displayed. Thus, the assigned workpieces of a workpiece group can be marked on a screen with a first color, e.g., red, and an LED on the mobile locating unit can also light up red. If another workpiece group is assigned, the same can be done with green, etc. The color coding of the mobile unit can end, for example, when a sorting process of the workpieces has been carried out and was confirmed by the operator, for example.

Furthermore, information about workpieces and/or workpiece groups can be displayed, the position data of which are located in the surroundings of the acquired position data of the mobile locating unit, e.g., closest to the acquired position data of the mobile locating unit. Furthermore, the position data of the workpieces and/or workpiece groups and the separation plan, e.g., the sorting data set, can be displayed on a display device together with the recorded position data of the mobile locating unit.

The matching of the position data can include a digital, computer-based superimposing of the acquired position data of the mobile locating unit with the separation plan. In some examples, a matching with a sorting data set derived from the separation plan can be performed.

In some embodiments, for the assignment of the mobile locating unit to a processing plan, position data of a position of the mobile locating unit, e.g., above the sorting station, are acquired with the indoor location system, if the position data of the mobile locating unit are spatially stationary during a given period of time or if the position data of the mobile locating unit are available at a time specified by an operator.

In further embodiments, position data are recorded with the indoor location system for the mobile locating unit for the assigning of the mobile location unit to a processing plan, if the mobile locating unit has been deposited at the sorting station on a workpiece of a workpiece group or in an area of the sorting station, in which mainly workpieces of the workpiece group are present.

In some embodiments, the indoor location system can be set up to determine the spatial position of the mobile locating unit in a production hall with several machine tools of the metal and/or sheet metal processing industry and provide a spatial resolution with which the position of the mobile locating unit can be determined in relation to the separated workpieces with a workpiece-exact resolution. The indoor location system can have a plurality of spatially stationary transceiver units that are spatially stationary at least during a position determination process.

In further embodiments, the method can include the steps following the assignment: positioning the mobile locating unit at a collection station; and sorting and depositing the workpieces of the subgroup of the processing plan assigned to the mobile locating unit at the collection station.

In further embodiments, a sorting data set is generated and/or the separation plan is recognized by reading a code provided on the flat material, which enables the production control system to access information on the separation plan and the position of the processed flat material.

Another aspect of the present disclosure features a production control system for controlling production processes in a production hall during the industrial processing of workpieces, e.g., in metal and/or sheet metal processing, includes a control unit (or a controller). The control unit is configured to perform the methods described herein. Furthermore, the production control system includes an indoor location system for the detection of a position of a mobile locating unit with several mobile and/or fixed transmitter-receiver (transceiver) units installed in the production hall, and an analysis unit. The transceiver units and the mobile locating unit are configured to generate, transmit, receive, and process electromagnetic signals. The analysis unit is configured to determine the runtimes of the electromagnetic signals between the transceiver units and the mobile locating unit and to determine the position of the mobile locating unit in the production hall from the runtimes of the electromagnetic signals. In some embodiments, the indoor location system is configured to provide data on the position of the mobile locating unit to the control unit.

In this context, generating electromagnetic signals means the conversion of electrical power, e.g., from a DC power supply, such as a battery or accumulator, into electromagnetic signals in the radio frequency range or higher frequencies, which are suitable for transmitting signals. Processing of electromagnetic signals in this context means the analog and/or digital conversion of electromagnetic signals into information that can be stored and/or processed and can lead to further actions of the mobile locating unit or transceiver units. For this purpose, the mobile locating units and the transceiver units can have electronic circuits and an electrical power supply. In some embodiments, the mobile locating units and the transceiver units can be configured to process data transmitted with the electromagnetic signals.

This enables a safe allocation of the correct separation plan or a reliable generation of the correct sorting data set in the production control. For example, several sheets of a flat material can be stacked on top of each other with separated workpieces still in the sheet at a time when no sorting can be performed, e.g., at night. By reading out the codes, an assignment can be made at a later time to support the sorting process, because the separation plan and/or the sorting data set belonging to the respective sheet to be sorted can be correctly assigned by the production control system.

In the metal processing industry, flatbed machine tools create workpieces as initial elements for subsequent processing operations (hereinafter also referred to as processing step). The workpieces are produced, for example, by a punching or laser cutting machine according to a separation plan, in various shapes and quantities from a flat material, e.g., in a sheet form, for example, a sheet of metal or a metal object, e.g., a pipe, sheet metal, or steel plate. The separation plan can be stored in a production control system of a manufacturing plant, e.g., digitally, which monitors and controls the processing processes or steps. In the case of a laser cutting machine, for example, the separation plan can include instructions for controlling where, for example, with a laser cutting beam, the flat material is to be cut through. If the position of the flat material processed by the flatbed machine tool is known, the positions of the workpieces in space or in the plane of the sorting station can be derived from the separation plan and be summarized in a digital sorting data set.

For the performed and subsequent industrial processing of the workpieces, all processing plans to be executed can be stored digitally in the production control system. In a digital processing plan, the corresponding information can be stored according to the order information for the industrial processing of workpiece groups. Workpiece groups of a processing plan include, for example, a subgroup of workpieces, which, after being produced with a machine tool by a separating process, are laid out ready for sorting at a sorting station. The workpiece group can include further subgroups of workpieces that were created with the same or with other machine tools.

A subgroup thus includes workpieces which, e.g., after production with a machine tool, e.g., a flatbed machine tool, from a flat material, are laid out ready for sorting on a sorting station, e.g., on a sorting table. A subgroup of workpieces and accordingly also a workpiece group including the subgroup can include workpieces, which together pass through subsequent processing steps or processing operations and belong to a common production order.

When sorting the workpieces that are laid out at the sorting station, the workpieces of an order are deposited at a collection station, e.g., at a workpiece collection point unit such as a transport trolley, and fed to the subsequent processing according to the order.

In some embodiments, for the execution of different orders with specific processing plans, a mobile locating unit is digitally assigned to a processing plan in the production control system. In this way, the associated order information can be spatially linked to the workpiece group via the mobile locating unit, and the workpieces assigned to the processing plan of an order can be localized in the production hall at any time.

Implementations of the present disclosure herein are based on the use of a 2D-/3D-interior (indoor) location system as a starting point for the location-dependent execution of digital assigning. For example, the indoor location system continuously transmits position data from mobile locating units to the production control system. For the assigning process, the position data of a mobile locating unit, which are recorded, e.g., on top of the sorting station, can be evaluated. For the assigning of the mobile locating unit to a processing plan, e.g., position data of a position of the mobile locating unit, e.g., on top of the sorting station, are used, where the position data are spatially stationary during a given period of time. This is the case, for example, if the mobile locating unit has been placed on a workpiece and thus does not move anymore. Alternatively, the position data can be used that are available at a time specified by an operator. For example, by pressing a button on the mobile locating unit, which is held over a workpiece, the operator can set the position data. Other inputs to the mobile locating unit are also conceivable, e.g., broadcasting, flickering, fluttering, wobbling, rotating, etc.

Special positions or shapes of the workpieces can represent the connection to specific processing plans. If a mobile locating unit can be associated with a workpiece of a specific shape or position, it is then possible to identify a processing plan that includes the workpiece with the specific shape and/or position and to assign it to the mobile locating unit. To this end, the production control system maps (compares) the position data of a mobile locating unit with positions of the workpieces derived from the separation plan and stored in the sorting data set. The mapping includes, for example, a calculation of the distances between the position data of the mobile locating unit and the position of a central point of generated workpieces, which are available in the sorting data set for the individual workpieces. To recognize that the captured position data belong to a specific workpiece with a specific shape and/or position, the smallest distance can be selected, for example. In some embodiments, the indoor location system can provide a workpiece-exact resolution with respect to the separated workpieces.

In general, the concepts disclosed herein can enable an increase in process reliability, an optimization of throughput times (considerable time savings in the assigning process), and correspondingly a cost optimization of production. Further advantages of aspects disclosed herein concern the simplified integration of an indoor localization into production processes. According to the present disclosure, a close interlocking of the assigning process and the production process is possible, which ensures process safety, especially in a still predominantly manual production environment.

DESCRIPTION OF DRAWINGS

Additional features and their usefulness result from the following description of embodiments on the basis of the drawings. The drawings show:

FIGS. 4A-4E are diagrams that illustrate a digital assignment process in which mobile locating units are assigned to processing plans.

DETAILED DESCRIPTION

Figure 1:
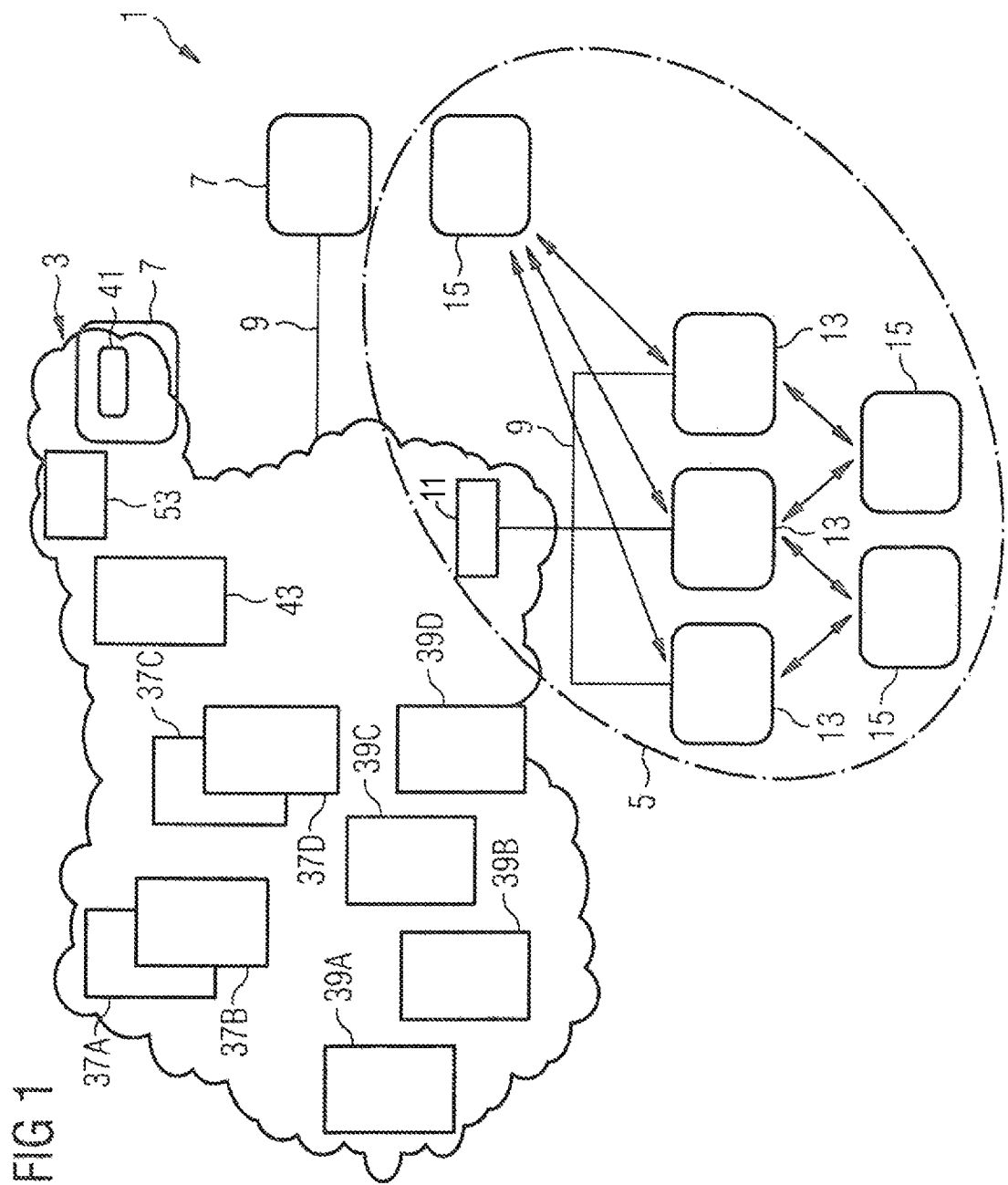
FIG. 1 is a schematic illustration of an example of a production control system with an indoor location system as described herein.

Aspects described herein are based in part on the realization that with the accuracy and reliability of new location systems based, e.g., on UWB technology, for example, with an accuracy in position determination of less than 30 cm, e.g., less than 10 cm, the use of indoor location systems in the context of industrial production is also possible for assigning a mobile locating unit (e.g., a mobile transceiver) to a processing plan.

The location systems disclosed herein, which are intended for integration into industrial production, are based on mobile locating units (also called mobile units or "tags") and (at least temporarily) stationary transceivers (also called "anchors"). A mobile locating unit can be an electronic component capable of communicating with the transceiver units, e.g., using UWB communication technology. A mobile locating unit can have its own time determination unit ("clock") for determining runtimes. In some embodiments, a mobile locating unit can have its own electronic signal transmission unit (e.g., transmitter). In some embodiments, a mobile locating unit may have its own electronic signal receiving unit (or receiver).

An assignment of a mobile locating unit to a processing plan (herein also referred to as digital assignment or processing plan assignment) can be made by positioning the mobile locating unit near a workpiece or on a workpiece that is associated with the processing plan.

If the mobile locating unit was assigned to the processing plan, the mobile locating unit can be placed on a workpiece collection point unit. The workpiece collection point unit is, for example, a transport trolley, a collection container, or a pallet and can be also referred to as a load carrier. In some embodiments, several mobile locating units can be linked to several production orders and thus to several processing plans. The production orders concern, inter alia, processing processes at different manufacturing stations in a production hall. A processing plan can be part of a production order, or can be the entire production order.

Now the sorting of the corresponding workpieces can be started. Sorting is also referred to herein as the spatial or physical assignment of the workpieces to the mobile locating unit. In the case of physical assignment, an operator can manually or eventually a correspondingly controllable machine can automatically deposit the workpieces to be assigned on the workpiece collection point unit next to the digitally assigned mobile locating unit. The physical assignment is completed, for example, manually by confirming a key, by shaking, or by another manual or automated entry on the mobile locating unit. The mobile locating unit can now be used to track a production order. Information on the order can be loaded onto the mobile locating unit at the beginning or as required. Missing parts, which cannot be assigned, can be signaled by a different input that distinguishes from the first input.

In connection with the figures, an example of the assignment suggested herein is explained below.

FIG. 1 shows schematically a production control system 1, which includes an MES (Manufacturing Execution System) 3 and an indoor location system 5 (hereinafter referred to briefly as location system).

The MES 3 can be configured to be connected to one or more machine tools 7 positioned in a production hall via wireless or wired communication links 9. In some embodiments, the MES 3 can be used to control process sequences/processing steps in the industrial production of workpieces with the machine tools 7. For this purpose, the MES 3 can receive information about the process sequences/processing steps as well as status information of the machine tools 7. The MES 3 can be implemented in a data processing device. This can be a single electronic data processing device (e.g., a server) or a group of several data processing devices (e.g., a server group/cloud). The data processing device or the group can be provided locally in the manufacturing plant or it can be set up decentralized outside.

One or more processing steps can be specified for each workpiece to be produced, and thus each workpiece group. Processing steps in metal and/or sheet metal processing include, for example, separating, cutting, punching, forming, bending, joining, surface treatment etc. of the workpieces. Such processing steps can be stored together in a processing plan 37A, . . . , 37D. A processing plan 37A, . . . , 37D can be intended for several workpieces in a workpiece group together.

The MES 3 is configured so that the processing plans 37A, . . . , 37D of the workpieces to be produced can be created and processed in it. The MES 3 can display the status of the workpieces. This means that the MES 3 can output both the sequence of the processing steps and the processing steps already performed. In some embodiments, the MES 3 can also be configured to assign individual processing plans 37A, . . . , 37D to machine tools 7. In some embodiments, the MES 3 can also be configured so that the processing steps of a processing plan 37A, . . . , 37D can be intervened manually or automatically at any time. In some embodiments, during the production process of several different processing plans 37A, . . . , 37D, it is possible to react very flexibly to different, e.g., unexpectedly, occurring events. These events can include, for example: a change in the priority of processing plans 37A, . . . , 37D or production orders, a new high-priority production order, cancellation of a production order, missing material, e.g., in the case of an erroneous delivery, machine failure, lack of qualified personnel, accidents, or detection of faulty quality of a processing step, etc.

The location system 5 is configured for indoor position determination of mobile locating units (e.g., mobile tracking units, mobile positioning units, or mobile locators) 15 (see FIG. 1). In some embodiments, it has several stationary and/or mobile transceiver units 13 and interacts with the MES 3 for the digital assigning. The mobile locating units 15 are located via the transceiver units (or transceivers) 13 using runtime analysis. The transceiver units 13 can be installed on the hall ceiling, hall walls, machine tools 7, storage structures, etc. The positions of the transceiver units 13 are, for example, stored in a digital site plan of the production hall. A mobile locating unit can also be operated as a mobile transceiver unit (e.g., a mobile transceiver).

With the help of the UWB technology mentioned at the beginning, the position determination can be performed with an accuracy of less than 30 cm, e.g., less than 10 cm, in a production hall, which cannot be reached by global positioning system (GPS) satellite signals. For an accuracy in the area of a sorting station 33 of a machine tool 7, which is sufficiently good for the assigning, the location system 5 can provide an increased density of transceiver units 13, to ensure a unique assignment of the mobile locating unit to a workpiece.

Figure 3:
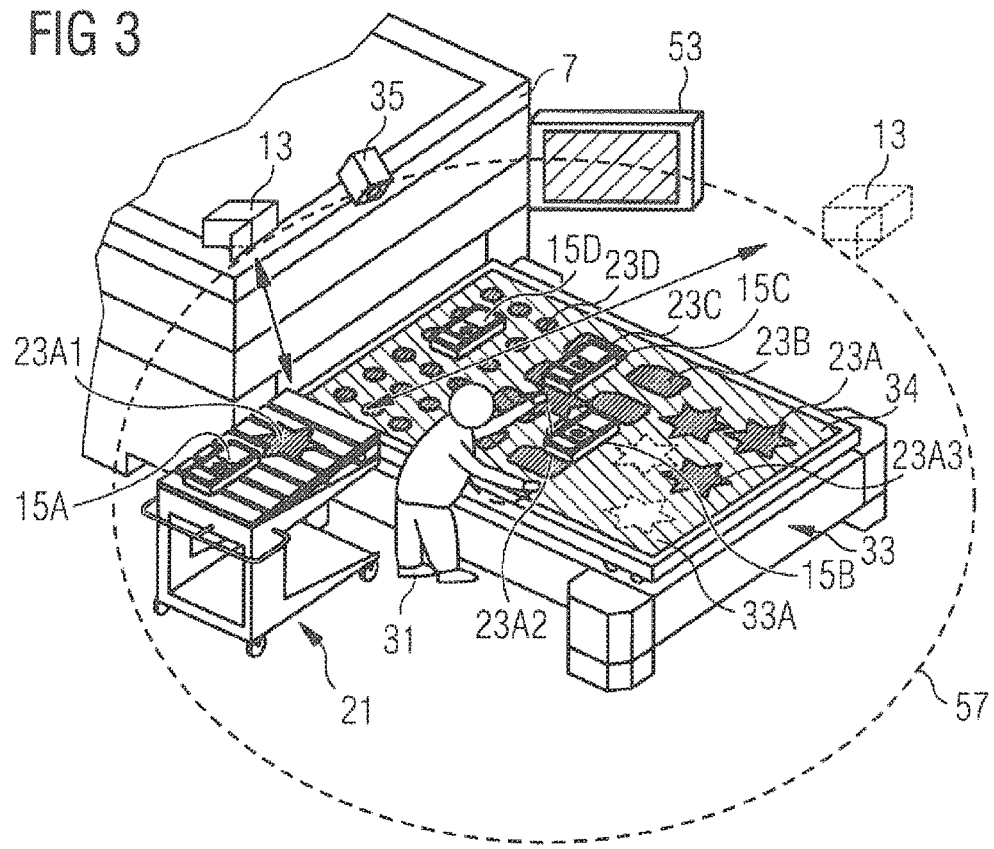
FIG. 3 is an illustration of an example of a machine tool with a sorting station and a transport trolley as well as several mobile locating units, which are integrated into an indoor location system.

The sorting station 33 can be a given place, a support element 33A of a sorting table of a machine tool, a shelf, a carrier, a table, a conveyor belt or the like. The placing station 33, e.g., if the place of placement is a conveyor belt, can also be aligned at an angle greater or smaller than 0° to the horizontal, in some cases, it can also permit variable positions of the parts in three-dimensional space during the sorting process. The sorting station 33 can be located directly at a machine tool 7, as shown in FIG. 3. Several metal sheets (also of different sheet thickness and/or material) can generally be stacked on top of each other at the sorting station and be sorted at a later time.

The indoor location system 5 includes an analysis unit 11, which is configured to determine the runtimes of electromagnetic signals between the transceiver units 13 and the mobile locating unit 15. From the runtimes, the analysis unit 11 derives the position of the mobile locating unit 15 in the production hall and provides the data on the position of the mobile locating unit 15 (position data) to the MES 3. For example, the analysis unit 11 can be configured as a part of the MES 3, in which the measured positions are matched with the sorting data sets also available in the MES 3. The indoor location system 5 is characterized by the fact that the position of the mobile locating units can be determined solely by the analysis unit 11, e.g., without manual interaction.

For example, the transceiver units 13 can be set up to send UWB radio signals to the mobile locating units and receive UWB radio signals from them. The distance between a mobile locating unit 15 and a fixed (or temporarily stationary) transceiver unit (e.g., transceiver) 13 can be determined by the time it takes for the signal to travel the distance between the two units. If the distances of several transceiver units (e.g., transceivers) 13 whose locations are known at the time of measurement are determined, the spatial location of the mobile locating unit 15 in relation to the transceiver units 13 can be determined, e.g., by triangulation.

For a runtime determination, the transceiver units 13 and the mobile locating unit 15 can be equipped with high-precision clocks that can determine the time to a few or even only fractions of ns. Even if the clocks in the transceiver unit 13 and in the mobile locating unit 15 are highly accurate, the clocks are not necessarily synchronized. Different methods of clock synchronization or elimination of errors following from the asynchronous clock course can be used. For example, one of the transceiver units 13 can send, e.g., as master position determination unit, a signal at a first time T1 and a second signal at a second time T2. The mobile locating unit 15 can know the time difference T2-T1 or the time difference can be transmitted together with the signals so that the mobile locating unit 15 can synchronize to the time of the transceiver units 13. Alternatively, the mobile locating unit 15 can send two signals at a previously known time difference Ta. In this case the transceiver unit 13 can determine the deviation from the synchronization from the reception of the first signal to the reception of the second signal by means of its own time measurement with its own clock and take it out of the distance measurement calculations. The temporal distance between the first signal and the second signal can be small so that the mobile locating unit 15 has not moved significantly during this time period. The temporal distance can be selected by the mobile locating unit 15 in such a way that it is a predetermined multiple or a predetermined fraction of the time required by the mobile locating unit 15 from the reception of a signal to which the mobile locating unit 15 can respond until the output of the first signal.

The transceiver units 13 can also be connected to the analyzer unit 11 via wireless or wired communication links. In some embodiments, mobile locating units 15 can only communicate via the transceiver units 13. Alternatively or additionally, the mobile locating units 15 can communicate independently with the analyzer unit 11/MES 3 via other communication connections (e.g., a WLAN connection).

The analysis unit 11 can, for example, serve as a central master positioning unit (also called a "server"). For example, the analysis unit 11 can define a communication frame for UWB communication. The communication frame contains, among other things, the transmission time of the frame/of the UWB radio signals. In an exemplary implementation of indoor localization, one of the transceiver units 13 as a master position determination unit for a position detection of one of the mobile locating units 15 transmits the communication frame to the transceiver units 13. This communication frame is used for the signal exchange used for the localization between the mobile locating units 15 and the transceiver units 13. The position of the stationary transceiver units with respect to the master position determination unit is known to the transceiver units 13, for example, by querying a central database, so that the transceiver units 13 as well as the analysis unit 11 know the time offset between transmission and reception of the UWB radio signal over the signal runtime.

After a predetermined time interval, e.g., 100 ms, the master positioning unit transmits a second communication frame that is received by the transceiver units 13 and mobile locating units 15. By recording the time from the beginning of the reception of the first frame to the beginning of the reception of the second frame, the transceiver units 13 and the mobile locating units 15 know what the master position determination unit understands by, e.g., exactly 100 ms. The mobile locating units 15 and the transceiver units 13 can thus synchronize the frequency of their time determination units with the master positioning unit.

After different, previously configured time intervals (measured from the reception of the second frame) mobile locating units send a response frame. For example, a "tag 1" sends after 10 ms, a "tag 2" after 20 ms, a "tag 3" after 30 ms, etc. This radio transmission is received by the transceiver units 13 and the exact point in time of reception with respect to the start of transmission of the second frame of the master position determination unit is transmitted to the analysis unit 11. The analysis unit 11 then determines the position data of the positions of the mobile locating units 15, e.g., via trilateration methods, and passes them on to the IVIES 3.

Using the exemplary analysis of run times and trilateration described above, the indoor location system 5 can detect the position of one or more mobile locating units (e.g., mobile transceiver units) 15 via transceiver units (e.g., transceivers) 13 using, e.g., UWB technology. The UWB technology uses frequency ranges from, e.g., 3 GHz to 5 GHz, whereas the UWB technology uses a relatively large frequency range for the formation of temporally sharply defined signal characteristics (communication frames). To locate an object that emits radio waves as precisely as possible, a signal with very steep edges can be required. This means that the signal can represent a rectangular signal shape over time rather than a sinusoidal signal shape. For this, a signal is needed, where several sinusoidal signals with different frequencies are superimposed. This is because a signal can be formed from several sinusoidal signals with different frequencies, which has a steep edge and can be approximated to an essentially rectangular shape over time. This means that several frequencies from a broadband frequency spectrum can be available to form a signal. Accordingly, UWB technology, which has a broadband frequency spectrum, can be suitable for exact localization. The technology and the usable frequency bands of the UWB technology can be described, for example, in the standard "IEEE 802.15-2015".

Figure 2:
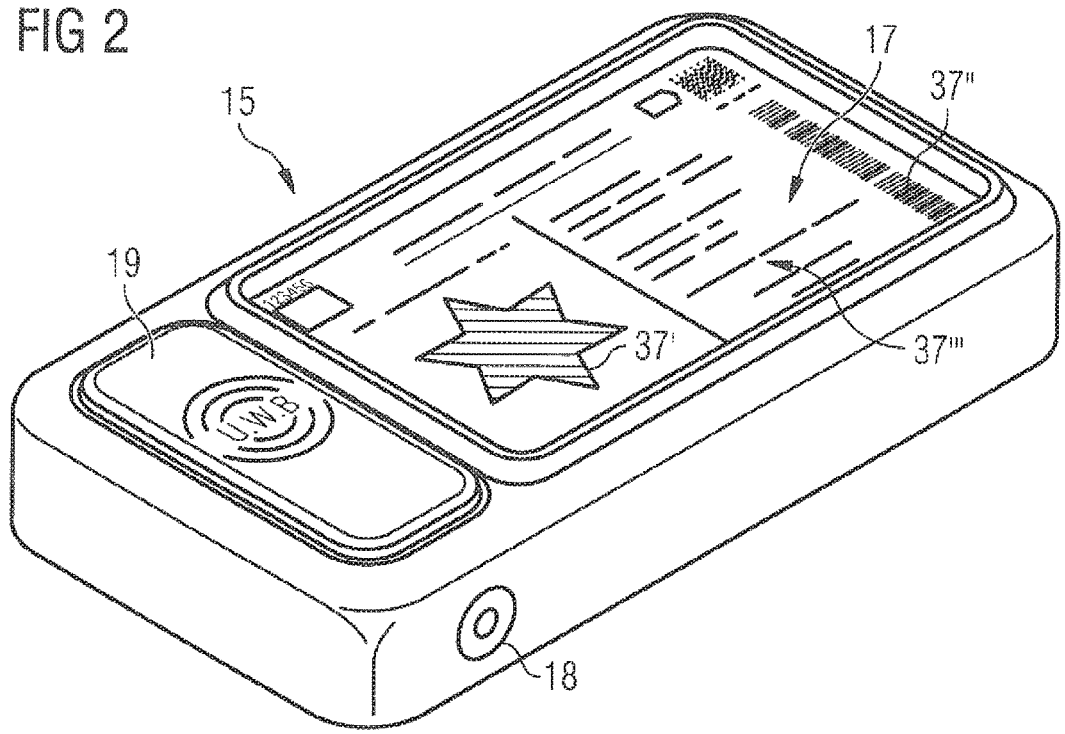
FIG. 2 is an illustration of an embodiment of an example of a mobile locating unit as described herein.

FIG. 2 shows an exemplary embodiment of the mobile locating unit 15. For the interaction of an operator with the mobile locating unit 15, it can have an electronically controllable display 17, for example, an e-ink display (also called electronic paper display) for the output of information. The electronics of mobile units can be operated with a battery or an accumulator.

In some embodiments, the mobile locating unit 15 can have a signal input device 19. This can be a sensor, e.g., a light sensor, an infrared (IR) sensor, a camera such as a digital camera, a temperature sensor, a pressure sensor such as push buttons or switches, a noise sensor such as a microphone or an ultrasonic sensor, or a sensor for other electrical, magnetic or electromagnetic signals etc.

In some embodiments, the mobile locating unit 15 can have a signal output device 18. This can be a light emitting device, e.g., a light emitting diode (LED), a sound emitting device, e.g., a signal generator, piezo buzzer, loudspeaker, ultrasonic transmitter, a transmitter for electric, magnetic or electromagnetic signals, etc.

In some embodiments, the mobile locating unit 15 can have a device for performing tactile movements, such as vibrating, tapping, twitching.

In some embodiments, the mobile locating unit 15 can have a device for detecting movement, such as shaking, bumping, knocking, gesture recognition, e.g., an accelerometer, MEMS (micro-electromechanical systems) or gyrometer.

On the display 17, for example, information on the order, readable for man and/or machine, can be coded and/or displayed in written form and/or as a figure. The display 17 can also be used as a signal output device for a feedback to the user. Further examples of signal emitting devices are LEDs and loudspeakers.

Furthermore, a signal input device for the input of parameters can be integrated in mobile units. For example, a user can press a key on the mobile locating unit 15 to enter signals. In some embodiments, a mobile unit may have a sensor for detecting audio signals together with the functionality to acquire, process and/or transmit data detected in this way. Thus, the mobile unit can be controlled by voice input, and audio data can be recorded, stored, evaluated, and forwarded to other mobile units.

Alternatively or in addition to the display 17 of the mobile locating unit 15, a display of a manufacturing plant (monitor 53 in FIG. 3) or a display specifically intended for the production hall (e.g., monitor displays 53A, . . . 53D in FIGS. 4A to 4D) can be used. The displayed data cannot always completely represent the entire information content of a workpiece or manufacturing process, but it can display context-based the data necessary for the corresponding manufacturing process, for example, the next manufacturing process for logistics, part geometry for picking, part tolerances for quality inspection. Display parameters such as size, color, movement, and flashing are suitable means to emphasize and support currently important information.

FIG. 1 illustrates schematically that in the production control system 1 the processing plans 37A, . . . , 37D can be stored, e.g., digitally, in which order information for the industrial machining of processing plan-specific workpieces is stored. A processing plan 37A, . . . , 37D can include order information, which is available, for example, in the form of geometry data sets 37' of the processing plan-specific workpieces and/or in the form of a coding data set 37" identifying an associated separation plan. Furthermore, the processing plan 37 can include one or more processing and workpiece parameters 37"' of the processing plan-specific workpieces. The processing plan 37 can be a digital processing plan.

In addition, FIG. 1 shows position data (position data sets) 39A, . . . 39D of the mobile locating units 15, which can be used to assign the mobile locating units 15 to the processing plans 37A, . . . 37D. In this context, a separation plan 41 for a machine tool 7 is also indicated in FIG. 1. The separation plan 41 is configured to indicate how workpieces of different shapes and quantities are separated from a flat material in a sheet form by machine tool 7. Separation plan 41 can be stored in a machine tool 7 (as a data set). The separation plan 41 can also be part of the production control system 1. In the production control system 1, a separation data set 43 can also be stored. The separation data set 43 includes position data derived from the separation plan 41 for workpieces arranged on a sorting station of the machine tool. The derived position data can be related to the sorting station, i.e., the derived position data can be known to the IVIES 3 in their spatial position in the production hall and with a high accuracy in the area of the sorting station.

Figure 4A:
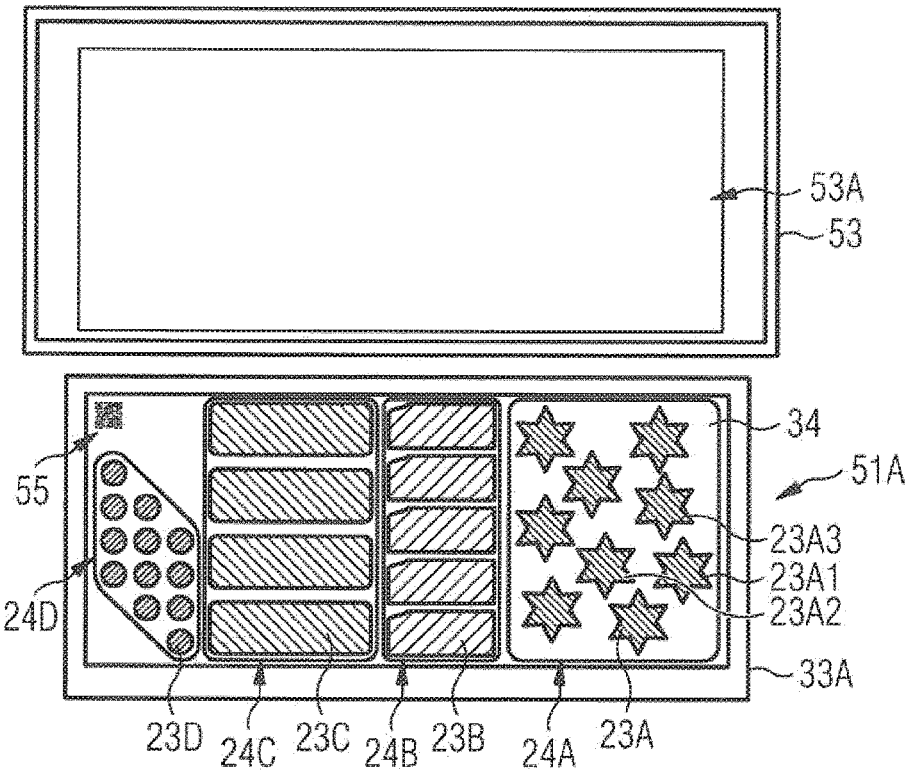

In connection with FIGS. 3 and 4A, . . . , 4E, the disclosure-related method for the digital assignment of a mobile locating unit to a processing plan is explained, where the method is supported by an indoor localization.

To illustrate the surroundings of the industrial processing of workpieces mentioned herein, FIG. 3 shows a sorting process as it can be carried out in connection with a (e.g., flatbed) machine tool 7, for example a laser cutting machine. The workpieces 23A, 23A1, 23A2, 23A3, 23B, 23C, 23D (hereinafter also referred to as cut material) cut with the laser cutting machine according to a separation plan 41 (as illustrated in FIG. 1) are provided to an operator 31 for sorting at a sorting station 33 in a sorting position. The workpieces lie next to each other on a support element 33A of the sorting station 33, while maintaining the sheet shape that is caused by a flat material fed to the machine tool.

In the case of a laser cutting machine, the workpieces were separated from the residual material 34 (dashed area) of the flat material by laser cutting, but still lie in the structure formed by the residual material 34.

In FIGS. 4A, . . . , 4E, top views 51A, . . . , 51E on the support element 33A are shown as well as position data accompanying the assignment as monitor displays 53A, . . . 53D to illustrate various aspects of the assignment procedure. The monitor displays can be used by the operator to follow the digital assignment process and to take corrective action if necessary. A corrective action means, for example, that the position of the mobile locating unit 15A, . . . , 15D is further changed, or a signal input device 19 of the mobile locating unit 15A, . . . , 15D is used to cause the controller to change or perform the assignment.

FIG. 4A shows exemplarily a top view 51A on cut material. According to FIG. 3, the cut material includes four types of differently shaped workpieces 23A, . . . , 23D, which are arranged on the support element 33A. For clarification, boundary lines are indicated, which indicate workpiece groups 24A, . . . , 24D. The cut material was placed at a known position in space by using the correspondingly movable support element 33A. In FIG. 4A, the production control system 1 has not yet determined any position data and, consequently, has not output any image data to the monitor display 53A of monitor 53. It is pointed out that the workpieces 23A, . . . , 23D and the residual material 34 can hardly be distinguished in their appearance for the operator. This is especially the case when very fine laser cutting lines are used. In this respect, the representation in FIGS. 4A, . . . , 4E deviate from the actual recognizability in its clarity. A large monitor has the advantage that the entire sheet metal panel with all its parts can be displayed and the parts of a workpiece group distributed over the panel can be highlighted, e.g., by color coding. Due to the clear visualization of the assignment, even small parts can be reliably assigned, for which the accuracy of the location system reaches its limits.

In some embodiments, the flat material can be provided with a machine-readable code 55 (e.g., Data Matrix Code: DMC). The machine-readable code 55 can always be placed at a predetermined position on the sorting station 33 for reproducible positioning of the cut material.

Even the code 55 is not necessarily easy to recognize on the processed flat material. Alternatively or in addition, if automation of the transport of the flat material is planned, the machine-readable code and its evaluation/placement can be dispensed with. An image of the code, e.g., a digital image, can be shown on the monitor display. This can be used in addition to the display of the board and the visualization of the assignment of the mobile locating units for the control by the operator.

Code 55 can also be used to automatically identify the separation plan in the production control system 1 with which the cut material was produced. From the known position of the cut material and the separation plan, the positions of the workpieces arranged on the sorting station 33 with respect to the sorting station 33 can be generated in the production control system 1 as a sorting data set 43.

Figure 4B:
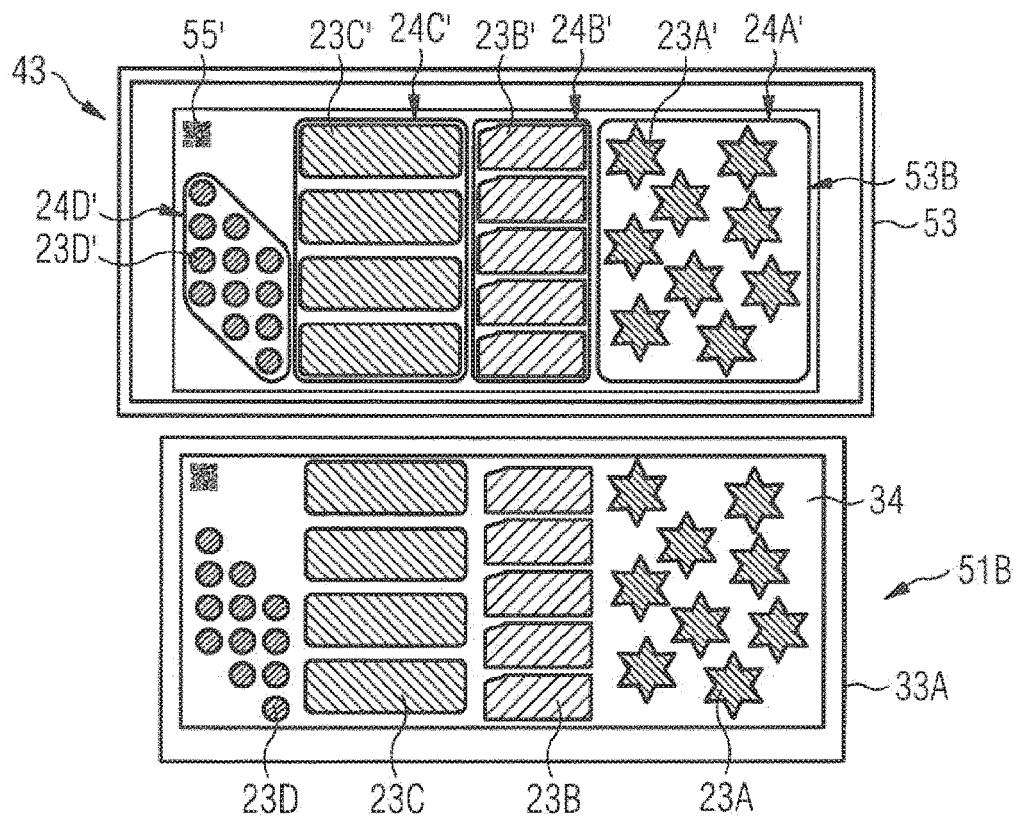

The sorting data set 43 is shown schematically on monitor display 53B of FIG. 4B as an example and is used to display the positions of the various workpieces 23A, . . . , 23D for the operator 31. For example, different workpieces with workpiece data sets 23A', . . . , 23D' can be displayed in colors, differently, or the boundaries of the workpieces can be displayed in a distinguishable or emphasized manner. Other output or marking options such as flashing, flickering, fluttering, wobbling, rotating, etc. are also conceivable. Furthermore, the monitor display 53B shows workpiece group data sets 24A', . . . , 24D' and an image 55' of the machine-readable code 55.

As mentioned above, a possible starting point for the digital assignment is the presence of several processing plans 37A, . . . , 37D as well as the sorting data set 43 in the production control system 1. To assign a mobile locating unit 15A, . . . , 15D to one of the processing plans 37A, . . . , 37D, one of the mobile locating units 15A is first placed near one of the workpieces 23A. For example, the mobile locating unit 15A can be placed on a workpiece 23A or a group of workpieces, for example, workpiece group 24A or a part of a workpiece group.

The assignment of the mobile locating unit 15A can now be done with an indoor location system 5, which uses a plurality of transceiver units 13 to determine the exact position of a mobile locating unit. Referring to FIG. 3, two transceiver (transmitter-receiver) units 13 are shown as examples. The transceiver units 13 provide a localizing area 57 in which of the mobile locating units 15A, . . . , 15D can be determined with high spatial resolution in their positions.

Figure 4C:
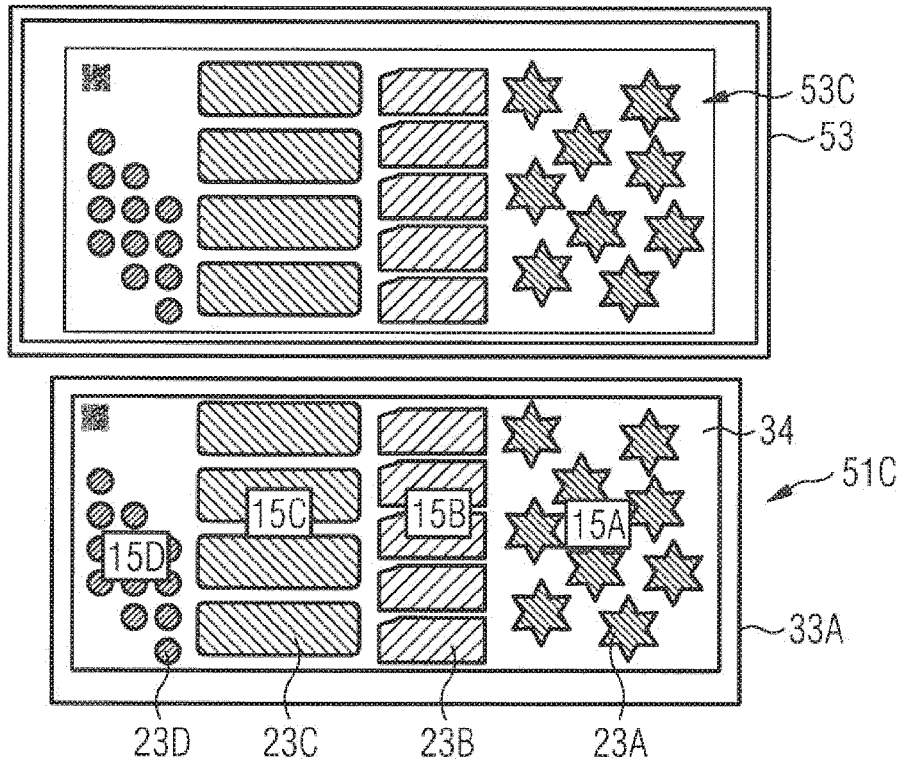

FIG. 4C shows, for example, how the operator 31 has placed four mobile locating units 15A, . . . , 15D on or in close proximity to the workpieces 23A, . . . , 23D and/or workpiece groups 24A, . . . , 24D to be sorted in order to initiate a processing plan-specific sorting of the cut material. For clarification, the mobile locating units 15A, . . . , 15D are located in the top view 51C of FIG. 4C on workpiece groups 24A, . . . , 24D as an example. In this example, each of the workpiece groups 24A, . . . , 24D has an identical shape so that it is easy to distinguish between the workpiece groups 24A, . . . , 24D. For example, the mobile locating unit 15A lies on the workpiece group 24A cut out with a star shape. A position determination of the mobile locating units 15A, . . . , 15D with the location system 5 has not yet been performed so that the monitor display 53C cannot yet display position data of the mobile locating units 15A, . . . , 15D.

Figure 4D:
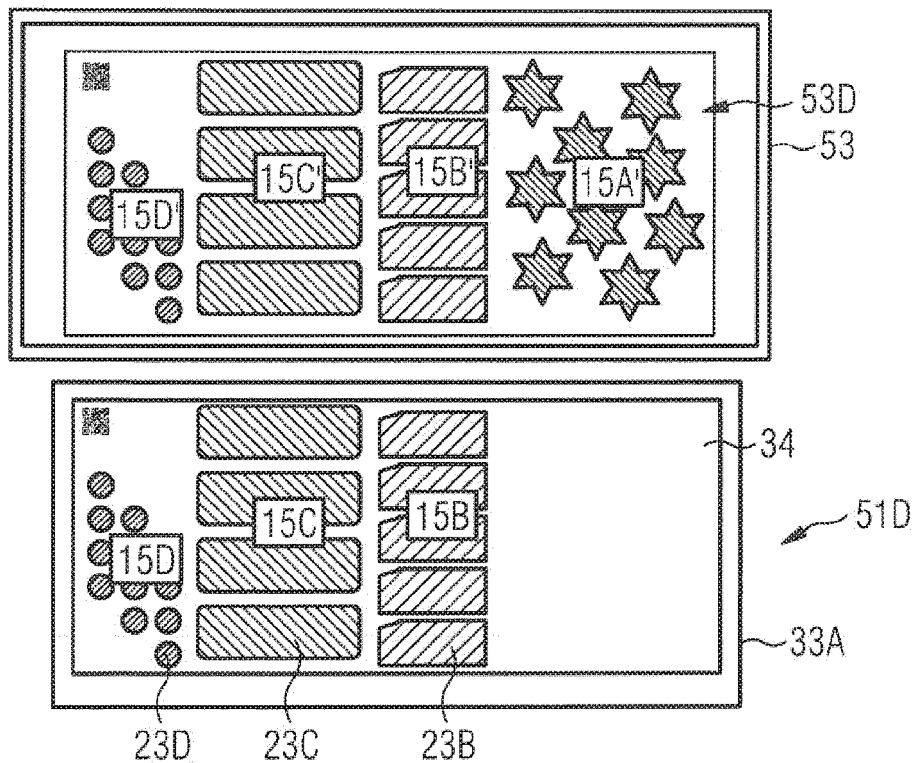

Referring to FIG. 4D, the positions of the mobile locating units 15A, . . . , 15D were recorded with the location system 5 and converted into position data. This data, together with the position data of the workpieces 23A, . . . , 23D and the complete workpiece group 24A, . . . , 24D, are shown on the monitor display 53D as workpiece data and as workpiece group data. Now, the position data of the mobile locating units 15A, . . . , 15D can be matched with the position data of the workpieces 23A, . . . , 23D, which are available in the sorting data set, the position data derived from the separation plan.

If the production control system 1 recognizes that the acquired position data of one of the mobile locating units 15A, . . . , 15D belongs to a workpiece 23A and/or a workpiece group 24A, it assigns this mobile locating unit 15A to the processing plan 37A, which also includes the workpiece 23A from this workpiece group 24A. A successful assignment of the mobile locating unit can be output to the operator via a signal output device, e.g., the monitor display 53D, but also the display 17 via LEDs, loudspeakers, etc. of the mobile locating unit 15A.

To clarify the sorting process, the mobile locating unit 15A was assigned to a processing plan 37A, which processes the star-shaped workpieces 23A. After the digital assignment, the locating unit 15A was removed from the workpieces 23A and placed on a transport trolley 21 as shown in FIG. 3. In the top view 51D of FIG. 4D, one can see that the mobile locating units 15B to 15D are still placed on workpieces 23B, 23C, 23D.

For performing the sorting, the mobile locating unit 15A can display information specific to the workpieces 23A on its display 17, which can be called up by the IVIES 3 due to the digital assignment. For example, as shown in FIG. 3, the star-shaped shape of the workpieces 23A is shown on display 17 to the operator 31.

In some embodiments, the assignment performed can be displayed on the monitor 53. As shown in FIG. 4D, images 15A', . . . , 15D' of the mobile units 15A, . . . , 15D can be displayed on the monitor 53. The data can be position data of the mobile units, which can be, e.g., digital images. The already assigned workpiece data sets 24A', . . . , 24D' can be highlighted on the monitor display to distinguish them from the respective workpiece data not yet assigned, e.g., to make visible which workpieces are already assigned and which are not yet assigned. It is quite conceivable that this is not only recognizable by the shapes (here star, circle, rectangle etc.), the shapes of the workpieces can be very similar, e.g., even the same, and the workpieces can nevertheless be assigned to different workpiece groups, because they can be processed differently in subsequent processing steps, for example.

In some embodiments, the mobile locating units are configured to receive information from the MES 3 about the workpieces belonging to the processing plan and to output this information for an operator. For example, the mobile locating units output information on the number of workpieces to be stored or the number of workpieces still missing, a subsequent processing step, an underlying order (customer), target material, etc. on display 17.

In FIG. 3, a first workpiece 23A1 and the mobile locating unit 15A has already been placed on the transport trolley 21, and operator 31 has already picked up another workpiece 23A2. FIG. 4D shows the completed sorting process of the workpiece group 24A of the processing plan 37A, so that all workpieces 23A have already been sorted and the top view 51D no longer shows any workpiece 23A.

It is not necessary to place the mobile locating unit one-to-one on a workpiece. A mobile locating unit can also be placed in an area where a larger number of identical workpieces have been cut from the flat material. For example, you can see in FIGS. 4A, . . . , 4D that the mobile locating unit 15D was placed on relatively small workpieces 23D with a round basic shape. If identical workpieces are distributed over the sheet metal board, the mobile locating unit can be placed on the largest contiguous arrangement of these workpieces.

Workpieces 23A, . . . , 23D of a workpiece group 24A, . . . , 24D can be, combined in groups as shown in FIGS. 4A, . . . , 4D, arranged locally close together. Depending on the separation pattern, they can also be arranged on the support element 33A in a scattered distribution.

FIG. 4E shows a top view 51E where, for example, the circular and small square workpieces are distributed over the panel. For example, the relatively small circular workpieces 23D—e.g., to save residual grid waste—could be arranged between the star-shaped workpieces 23A and at other locations. Accordingly, the workpiece group 24D is indicated in two parts.

Furthermore, in the separation plan of FIG. 4E, workpieces with the same shape were assigned to different workpiece groups 24Ba, 24Bb and 24Bc and correspondingly different processing plans.

The display of the sorting data set 43 on the monitor 53 allows, for example, all workpieces of a workpiece group/processing plan to be highlighted for the operator. For example, the workpieces can be shown in the same color on the monitor display. For example, for the top view of FIG. 4E, all small round workpieces 23D, which belong to a common processing plan, can be illustrated to the operator highlighted in color on the monitor display under all workpieces lying on the sorting table.

If further information on the sorting station is available in digital form, this sorting station can also be displayed on the monitor. For example, the size, orientation, and position of a transport trolley equipped with a mobile locating unit can be recorded and stored in the MES. The transport trolley from FIG. 3 can, for example, also be displayed on the monitor 53 as a sorting station. In some examples, the trolley 21 can be displayed together with the mobile locating unit 15A, where, for example, the workpiece group assigned to the mobile locating unit 15A is also visually highlighted to support sorting onto the trolley 21.

FIG. 3 also shows a camera 35 for image acquisition of the sorting process. The camera 35 can be used to monitor, for example, how many workpieces or which workpieces have already been sorted. Several cameras can also be provided. In this case, the images recorded by the cameras can be combined to form an image with a higher resolution. The camera 35 can also be used to recognize a sheet, for example, by means of the cutting patterns or by scanning a code 55, which may have been applied.

After the sorting process has been completed, the operator 31 can, for example, activate a button on the mobile locating unit or use another signal input device to inform the production control system that the sorting process has been completed. Assigned mobile locating units can be used as independent units in the subsequent process sequence during the production. They can be carried by an operator together with the assigned workpieces from processing step to processing step/from machine tool 7 to machine tool 7.

The sorting of another panel can be done as follows: the further panel can contain workpieces of a workpiece group whose parts of the previous panel have already been sorted. The already sorted parts and the assigned mobile unit(s) are still at the workpiece collection point unit (trolley 21). Now, those parts of this workpiece group can be displayed on the monitor automatically color-coded that still have to be sorted for the started workpiece group/processing plan, and the assigned mobile unit lights up in the same color. Alternatively, however, a new mobile unit can be placed on this workpiece group that still has to be sorted, in which case the LED of the other tag goes out.

FIGS. 4A, . . . , 4D visualize steps of the methods described herein. For example, in a first step (as illustrated in FIG. 4A) the separated workpieces are placed on the sorting station 33. In a subsequent step (as illustrated in FIG. 4B), the separation plan 41 (or the associated sorting data set 43) is determined, and the position data (position data sets) of the workpieces 23A, . . . , 23D and/or workpiece groups 24A, . . . , 24D are displayed on the display 53B as images of the data sets 23A', . . . , 23D', 24A', . . . , 24D' of the workpieces 23A, . . . , 23D and/or workpiece groups 24A, . . . , 24D. In some examples, code 55 can be scanned to determine the separation plan 41 (or the assigned sorting data set 43).

In a further step (as shown in FIG. 4C), the mobile locating units 15A, . . . , 15D on the sorting station 33 are first spatially assigned to certain workpieces 23A, . . . , 23D and/or workpiece groups 24A, . . . , 24D. This can be done manually or automatically.

Now the positions of the mobile locating units 15A, . . . , 15D are determined by the location system 5 and the corresponding position data are mapped with position data of the workpieces 23A, . . . , 23D and/or the workpiece groups 24A, . . . , 24D.

In a subsequent step, the mobile units 15A, . . . , 15D, which are assigned to the workpieces 23A, . . . , 23D and/or the workpiece groups 24A, . . . , 24D, are assigned to the processing plans 37A, . . . , 37D, which include the workpieces 23A, . . . , 23D and/or workpiece groups 24A, . . . , 24D (as illustrated in FIG. 4D).

The images 15A', . . . , 15D' of the mobile units 15A, . . . , 15D can also be displayed on the display 53D.

Now, for example, the mobile unit 15A can be placed on a workpiece collection station and the workpieces 23A, 23A1, 23A2 of the associated workpiece group 24A, i.e., the workpieces that belong to the processing plan 37A corresponding to the mobile unit 15A, can be sorted.

In this way, all mobile units 15A, . . . , 15D can be used and assigned workpiece groups 24A, . . . , 24D can be sorted.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for assigning a mobile locating unit to a processing plan for industrial processing of a workpiece group including one or more workpieces, the method comprising:

maintaining, in a production control system, one or more processing plans comprising order information for industrial processing of one or more workpiece groups, wherein each of the one or more processing plans is associated with a corresponding workpiece group that comprises a subgroup of workpieces arranged at a sorting station, and wherein the one or more workpiece groups have been separated according to a separation plan with a machine tool and are arranged on the sorting station;

matching position data of the mobile locating unit with position data of the one or more workpiece groups or the workpieces, wherein the position data of the one or more workpiece groups or the workpieces is derived from the separation plan, and wherein the position data of the mobile locating unit is acquired with an indoor location system for a position of the mobile locating unit;

assigning the mobile locating unit to the workpiece group or a workpiece based on a result of the matching; and assigning the mobile locating unit to the processing plan associated with the workpiece group or the workpiece assigned to the mobile locating unit.

2. The method of claim 1, further comprising:
after assigning the mobile locating unit to the workpiece group or the workpiece and assigning the mobile locating unit to the processing plan, displaying on a display information indicating the assigning of the mobile locating unit to the processing plan and the assigning of the mobile locating unit to the workpiece group or the workpiece.

3. The method of claim 2, further comprising:
displaying on the display data of the workpiece group or the workpiece.

4. The method of claim 2, further comprising:
displaying information of at least one of workpieces or workpiece groups, position data of which lie in surroundings of position data of mobile locating units.

5. The method of claim 1, further comprising:
displaying on a display position data of the workpieces or the one or more workpiece groups and a sorting data set derived from the separation plan, together with position data of one or more mobile locating units.

6. The method of claim 1, wherein matching the position data of the mobile locating unit with the position data of the one or more workpiece groups or the workpieces comprises:
performing a digital, computer-based superimposing of the position data of the mobile locating unit with a sorting data set derived from the separation plan.

7. The method of claim 1, further comprising:
for the assigning of the mobile locating unit to the processing plan, recording position data of the position of the mobile locating unit above the sorting station with the indoor location system as the position data of the mobile locating unit in response to determining at least one of:
the position data of the mobile locating unit is spatially stationary for a given period of time or
the position data of the mobile locating unit is available at a time specified by an operator.

8. The method of claim 1, further comprising:
for the assigning of the mobile locating unit to the processing plan, acquiring the position data of the mobile locating unit with the indoor location system when the mobile locating unit is located at the sorting station on a workpiece of the workpiece group or in an area of the sorting station where the one or more workpieces of the workpiece group are present.

9. The method of claim 1, wherein the indoor location system is configured for spatial position determination of the mobile locating unit in a production hall with one or more machine tools, and
wherein the indoor location system is configured to provide a spatial resolution with which the position of the mobile locating unit is determined with respect to separated workpieces with a workpiece-exact resolution.

10. The method of claim 1, wherein the indoor location system comprises a plurality of spatially stationary transceiver units that are spatially stationary at least during a position determination process.

11. The method of claim 1, wherein:
after the assigning of the mobile locating unit to the processing plan, the mobile locating unit is positioned at a collection station, and a subgroup of workpieces of the workpiece group associated with the processing plan assigned to the mobile locating unit is sorted and deposited at the collection station.

12. The method of claim 11, further comprising:
displaying on a display digital information on the collection station, together with the position data of the mobile locating unit.

13. The method of claim 1, further comprising at least one of:
generating a sorting data set of the separation plan by reading a code provided on a flat material, or
recognizing the separation plan by reading the code provided on the flat material,
wherein the production control system is configured to access information on the separation plan and a position of the flat material based on the code.

14. The method of claim 1, further comprising:
outputting, by the production control system, an assignment of the mobile locating unit to the processing plan by controlling the mobile locating unit to display a workpiece parameter on a display of the mobile locating unit to assist in manually performing of sorting of a subgroup of workpieces of the workpiece group associated with the processing plan assigned to the mobile locating unit.

15. A production control system for controlling production processes in a production hall in industrial processing of workpieces, the production control system comprising:
a controller; and
an indoor location system configured to detect a position of a mobile locating unit in the production hall, the indoor location system comprising:
a plurality of transceiver units in the production hall, and
an analyzer,
wherein the transceiver units and the mobile locating unit are configured to generate, transmit and receive, and process electromagnetic signals, and
wherein the analyzer is configured to determine runtimes of the electromagnetic signals between the transceiver units and the mobile locating unit and to determine the position of the mobile locating unit in the production hall from the runtimes of the electromagnetic signals, and
wherein the indoor location system is configured to provide position data on the position of the mobile locating unit to the controller, and
wherein the controller is configured to:
maintain one or more processing plans comprising order information for industrial processing of one or more workpiece groups, wherein each of the one or more processing plans is associated with a corresponding workpiece group that comprises a subgroup of workpieces arranged at a sorting station, and wherein the one or more workpiece groups have been separated according to a separation plan with a machine tool and are arranged on the sorting station, match the position data on the position of the mobile locating unit with position data of the one or more workpiece groups or the workpieces, wherein the position data of the one or more workpiece groups or the workpieces is derived from the separation plan;

assign the mobile locating unit to a workpiece group or a workpiece based on a result of the matching; and assign the mobile locating unit to a processing plan associated with the workpiece group or the workpiece assigned to the mobile locating unit.

16. The production control system of claim 15, wherein the controller is configured to:

output an assignment of the mobile locating unit to the processing plan by controlling the mobile locating unit to display a workpiece parameter on a display of the mobile locating unit to assist in manually performing of sorting of a subgroup of workpieces of the workpiece group associated with the processing plan assigned to the mobile locating unit.

17. The production control system of claim 15, wherein the indoor location system is configured to provide a spatial resolution with which the position of the mobile locating unit is determined with respect to separated workpieces with a workpiece-exact resolution.

18. The production control system of claim 15, wherein the controller is configured to:

after assigning the mobile locating unit to the workpiece group or the workpiece and assigning the mobile locating unit to the processing plan, display on a display information indicating the assigning of the mobile locating unit to the processing plan and the assigning of the mobile locating unit to the workpiece group or the workpiece.

19. The production control system of claim 15, wherein the controller is configured to:

display on a display position data of the workpieces or the one or more workpiece groups and a sorting data set derived from the separation plan, together with position data of mobile locating units.

20. The production control system of claim 15, wherein the controller is configured to:

matching the position data on the position of the mobile locating unit with position data of the one or more workpiece groups or the workpieces by performing a digital, computer-based superimposing of the position data of the mobile locating unit with a sorting data set derived from the separation plan.

* * * * *